US010927813B2

(12) United States Patent
Picard et al.

(10) Patent No.: US 10,927,813 B2
(45) Date of Patent: Feb. 23, 2021

(54) WIND TURBINE OPERATION

(71) Applicant: General Electric Company, Schenectady, NY (US)

(72) Inventors: Thomas Picard, Barcelona (ES); Marc Canal Vila, Barcelona (ES)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 16/408,617

(22) Filed: May 10, 2019

(65) Prior Publication Data

US 2019/0345915 A1 Nov. 14, 2019

(30) Foreign Application Priority Data

May 11, 2018 (EP) ...................................... 18382325

(51) Int. Cl.
*F03D 7/02* (2006.01)
*F03D 9/25* (2016.01)

(52) U.S. Cl.
CPC ............. *F03D 7/0276* (2013.01); *F03D 9/25* (2016.05); *F05B 2260/95* (2013.01); *F05B 2270/101* (2013.01); *F05B 2270/32* (2013.01); *F05B 2270/404* (2013.01); *F05B 2270/804* (2013.01)

(58) Field of Classification Search
CPC ................................. F03D 7/0276; F03D 9/25
See application file for complete search history.

(56) References Cited

U.S. PATENT DOCUMENTS 6,324,895 B1 * 12/2001 Chitnis ................ C10G 11/185
73/23.31
2003/0165379 A1  9/2003 Wobben

FOREIGN PATENT DOCUMENTS

| EP | 1494020 A1 * | 1/2005 | ............. F01D 21/12 |
| EP | 1564537 A1 * | 8/2005 | ........... F01D 21/003 |
| EP | 2 889 472 A1 | 7/2015 | |
| EP | 3 088 733 A1 | 11/2016 | |
| EP | 3260843 A1 * | 12/2017 | ........... G01N 17/043 |
| JP | 2010060425 A * | 3/2010 | ........... F01D 21/003 |
| WO | WO 2018/091057 A1 | 5/2018 | |
| WO | WO-2018091057 A1 * | 5/2018 | ............. F03D 7/043 |

OTHER PUBLICATIONS

EP Search Report, dated Nov. 6, 2018.

* cited by examiner

*Primary Examiner* — Michael Lebentritt
(74) *Attorney, Agent, or Firm* — Dority & Manning, P.A.

(57) ABSTRACT

Methods of operating a variable speed wind turbine as a function of wind speed are described. The wind turbine has a rotor with a plurality of blades and a generator. The generator has a design rotor speed which varies so as to follow a theoretical generator rotor rotational speed curve describing the rotational speed of the rotor as a function of wind speed. The method comprises determining an erosion risk condition of the blades, determining erosion damage of one or more of the blades accumulated over time and changing the rotor rotational speed from the design rotor speed as a function of the determined erosion risk condition and the determined accumulated erosion damage. Wind turbines configured to carry out such methods are also described.

15 Claims, 5 Drawing Sheets

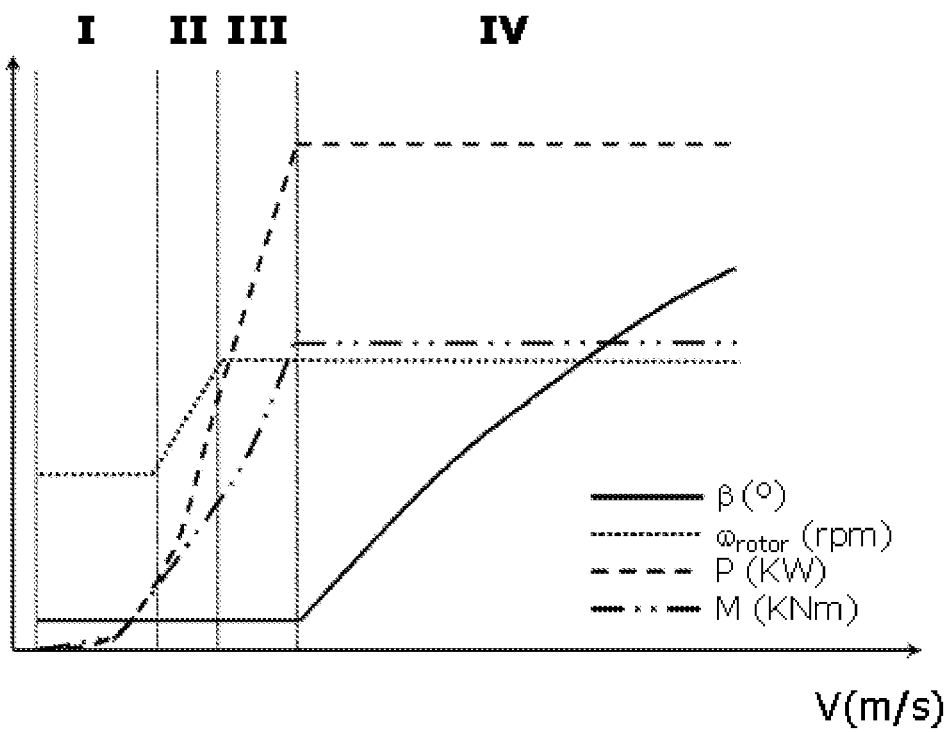
FIGURE 3 – PRIOR ART
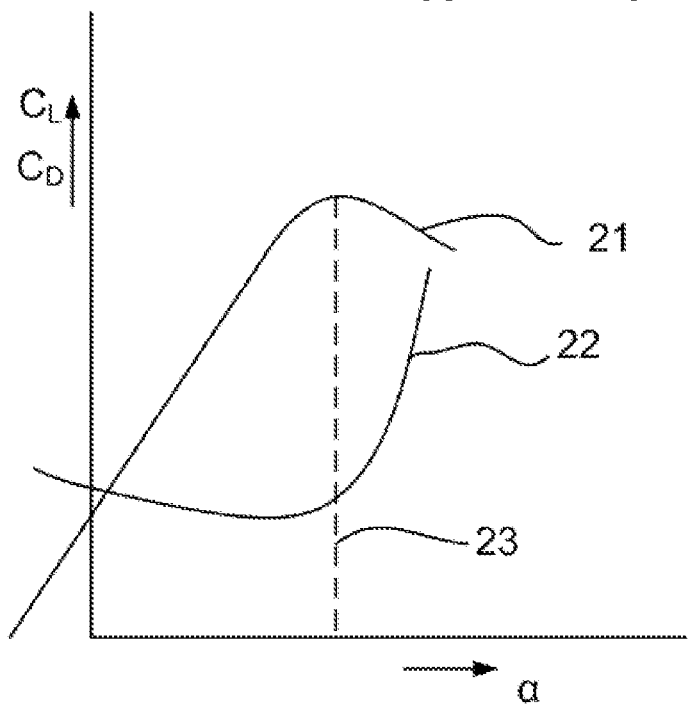
FIGURE 4 – PRIOR ART

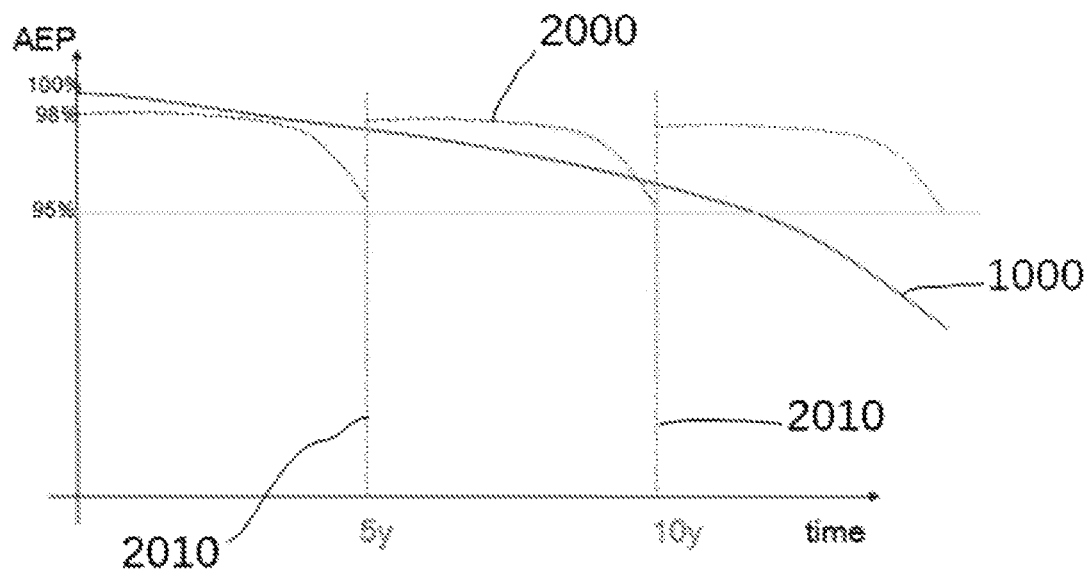
FIGURE 6
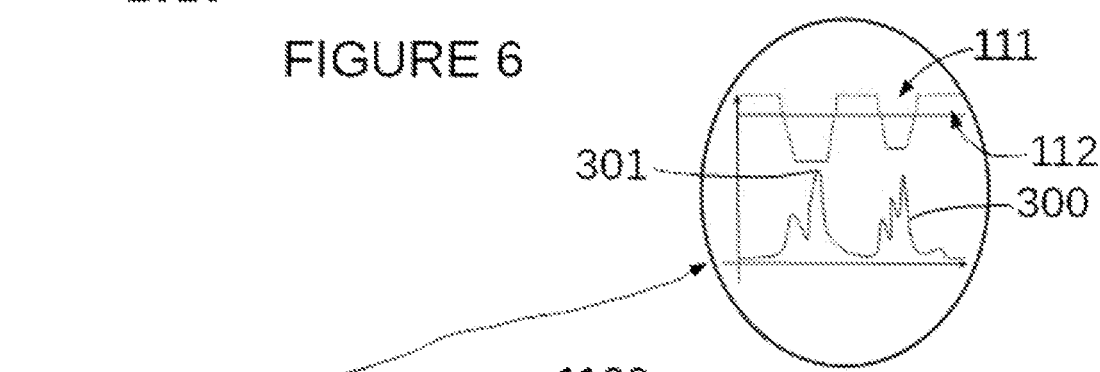
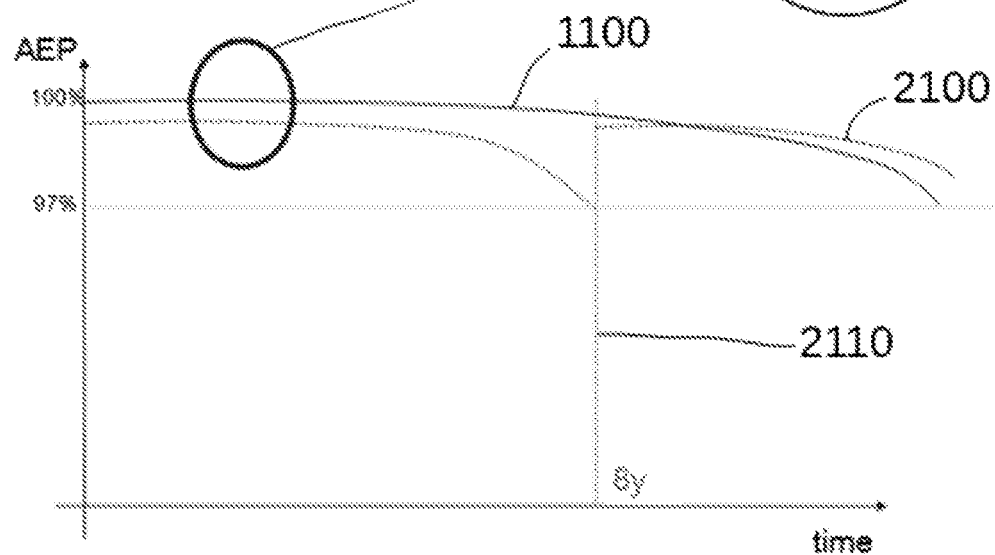
FIGURE 7

WIND TURBINE OPERATION

The present disclosure relates to methods of operating wind turbines and wind turbines suitable for such methods.

BACKGROUND

Modern wind turbines are commonly used to supply electricity into the electrical grid. Wind turbine blades are typically attached, at a blade root portion, to a rotor hub, either directly or through an extender, i.e. a cylindrical element arranged between the blade root portion and the hub to increase the diameter of the rotor swept area. The rotor is set into rotation under the influence of the wind on the blades. The rotation of the rotor shaft drives the generator rotor either directly ("directly driven") or through the use of a gearbox. The operation of the generator produces the electricity to be supplied into the electrical grid.

A variable speed wind turbine may typically be controlled by varying the generator torque and the pitch angle of the blades. As a result, aerodynamic torque, rotor speed and electrical power will vary.

A common prior art control strategy of a variable speed wind turbine is described with reference to FIG. 3 which represents a curve commonly known as "power curve" that describes the operation as a function of the prevailing wind speed. In FIG. 3, the operation of a typical variable speed wind turbine is illustrated in terms of the pitch angle ($\beta$), the electrical power generated (P), the generator torque (M) and the rotational velocity of the rotor ($\omega$), as a function of the wind speed.

Even though the wind speed is normally determined in an indirect manner by determining the rotor's rotational speed, e.g. by measuring the rotational speed of the generator, it may be regarded that the control is carried out as a function of the wind speed. Based on e.g. the rotational speed of the generator, the control may be implemented by varying the generator torque and/or the blade pitch angle.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In general, in the second operational range, the blades pitch angle may be substantially constant, whereas in order to achieve the objective of maximum energy, the generator torque and thus the rotor speed may be varied so as to keep the tip speed ratio $\lambda$ (tangential velocity of the tip of the rotor blades divided by the prevailing wind speed) constant so as to maximize the power coefficient $C_p$.

In order to maximize power output and keep $C_p$ constant at its maximum value, the rotor torque may in examples be set in accordance with the following equation: $T = k \cdot \omega^2$, wherein k is a constant, and $\omega$ is the rotational speed of the generator. In a direct drive wind turbine, the generator speed substantially equals the rotor speed. In a wind turbine comprising a gearbox, normally, a substantially constant ratio exists between the rotor speed and the generator speed.

This means that by maintaining the tip speed ratio $\lambda$ at a constant optimum value the power coefficient $C_p$ can be optimized in this operational range. The wind turbine blades are thus normally designed particularly for their operation in this range.

In a third operational range, which starts at reaching nominal (rotational) rotor speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades may be kept in a constant pitch position, namely the "below rated pitch position". Said default pitch position may generally be close to a 0° pitch angle. The exact pitch angle in "below rated" conditions however depends on the complete design of the wind turbine.

The before described example of operation may be translated into a so-called power curve, such as the one shown in FIG. 3. Such a power curve may reflect the optimum operation of the wind turbine under steady-state and ideal design conditions, i.e. the theoretical/design operational curves for the pitch angle ($\beta$), rotor rotational speed ($\omega$), electrical power generated (P) and generator torque (M) in steady-state conditions, as a function of the wind speed.

In the supra-nominal zone of operation in accordance with this example of operation, i.e. at winds speeds at or above the nominal wind speed, the maximum available energy in the wind stream is very consciously not captured. That is, the blades are actively pitched to a position in which they "catch" less wind, and generate less torque than possible. This is mainly done to limit the structural loads on the wind turbine.

In examples, wind turbines may be controlled using different power curves resulting in different pitch and generator controls.

Wind turbine blades are typically designed for optimum aerodynamic conditions to optimize the wind turbine's performance for maximum generation of electricity. However, in addition to operational loads, wind turbine blades are also subjected to a wide variety of harsh environmental conditions, particularly including conditions of abrasive particles such as (but not limited to) rain droplets, dust particles, sand particles, insects, salt (especially in offshore wind turbines) and/or other substances. These abrasive particles impinging upon the blade surface, particularly upon the blade leading edge, may have an adverse effect thereon causing wear of the blade surface, particularly of its leading edge. It is known to protect the leading edge of a blade with a so-called leading edge protector. However, in operation, the leading edge protection may also gradually erode and wear off.

Deteriorated or eroded blades tend to generate less lift and more drag, thus decreasing the efficiency of the wind turbine. Particularly, roughness at the leading edge may cause an early transition from laminar to turbulent flow, i.e. whereas a laminar boundary layer would be arranged around a non-eroded blade section for a significant part of the chord, an eroded or corroded blade section for the same wind speed and the same angle of attack could have a turbulent boundary layer. This may reduce the maximum lift that can be obtained. The curve of the lift coefficient may thus have a reduced slope starting at a certain angle of attack. The lift is thus reduced for a given angle of attack and the drag may be increased due to increased friction when blades are corroded or eroded and this is more extreme in offshore wind turbines. Another effect is that the aerodynamic flow around the blade is more prone to separation. Aerodynamic stall may thus occur at lower angles of attack than expected. Put in other words, an eroded blade may have a limited maximum rotational speed thus limiting its power output. This means that as a consequence of erosion in the blades, a loss in power production may occur.

It is known that lift and drag coefficients of a wind turbine may vary as a function of the angle of attack of a blade section. Generally, the lift coefficient (reference sign 21 of FIG. 4) increases to a certain maximum at a so-called critical angle of attack 23.

This critical angle of attack 23 is also sometimes referred to as stall angle. The drag coefficient (reference sign 22) may generally be quite low and starts increasing in an important manner close to the critical angle of attack 23. This rapid change in aerodynamic behaviour of a profile or blade section is generally linked to the phenomenon that the aerodynamic flow around the profile (or blade section) is not able to follow the aerodynamic contour and the flow separates from the profile. The separation causes a wake of turbulent flow, which reduces the lift of a profile and increases the drag significantly.

The exact curves of the lift coefficient and drag coefficient may vary significantly in accordance with the aerodynamic profile chosen. However, in general, regardless of the aerodynamic profile chosen, a trend to increasing lift up until the critical angle of attack and also a rapid increase in drag after the critical angle of attack can be found.

It can thus be understood that with increasing angle of attack, the lift coefficient of the profile increases, until "stall". If the angle of attack is increased further, the lift coefficient is reduced. During operation, whenever the blades become e.g. eroded the lift coefficient of the profile starts to "flatten" before reaching the "stall" condition. This reduces efficiency of the wind turbine thus resulting in loss of power production.

Blades, and particularly blade leading edges, can be protected with leading edges protectors (LEP). Document US2017/0314532 describes protective leading edge covers made of polyurethane materials. However, in harsh environmental conditions even these protectors get corroded thereby leading to e.g. limitations in tangential velocity of tip speed (e.g. to 90 m/s) which involves annual energy production (AEP) drops.

The LEPs can be repaired, but, replacement or repairs of LEPs in situ during the wind turbine lifetime, is a rather cumbersome and expensive task, particularly for offshore wind turbines.

There thus still exists a need for improved methods of operating a wind turbine that increase overall wind turbine efficiency.

SUMMARY

In accordance with a first aspect, a method of operating a variable speed wind turbine as a function of wind speed is provided. The wind turbine has a rotor with a plurality of blades and a generator. The generator has a design rotor speed which varies so as to follow a theoretical generator rotor speed curve describing the rotational speed of the rotor as a function of wind speed. The method comprises determining an erosion risk condition of one or more of the blades, and determining erosion damage accumulated over time. The method further comprises changing the rotor rotational speed from the design rotor speed as a function of the determined erosion risk condition and the determined accumulated erosion damage.

According to this aspect, the rotor rotational speed can be varied when an erosion risk condition of a blade is detected and further considering the erosion damage accumulated over time in at least one blade. This means that rotor rotational speed no longer necessarily follows its theoretical/design steady state rotor speed curve, but it takes into consideration the fact that e.g. harsh environmental conditions can be present and that one or more blades can already be eroded to some extent.

This way, (further) erosion damage can be reduced or at least delayed by adapting the rotor rotational speed. Also, when there is no erosion risk and/or when there is no (or very little) accumulated erosion damage, this information may be taken into account to adapt the rotor speed, e.g. to increase rotor speed in accordance with circumstances to potentially capture more power without affecting wind turbine lifetime or downtime. A precise control of erosion can be provided by taking into account both environmental conditions and the actual status of the (leading edge) blade surface.

In another aspect, a method of operating a variable speed wind turbine as a function of wind speed is provided. The wind turbine has a rotor with a plurality of blades and a generator. The generator has a theoretical generator rotor rotational speed curve describing the theoretical rotational speed of the rotor as a function of steady state wind speed. Operation of the wind turbine comprises a sub-nominal zone of operation for wind speeds below a nominal wind speed, and supra-nominal zone of operation for wind speeds equal to or above the nominal wind speed. The sub-nominal zone of operation comprises a first operational range which extends from a cut-in wind speed to a first wind speed, a second operational range extending from the first wind speed to a second wind speed, and a third operational range extending from the second wind speed to the nominal wind speed. The method comprises operating the wind turbine following a theoretical power curve describing operation of the wind turbine as a function of steady state wind speed, and checking whether an erosion risk condition exists. In case an erosion risk condition is detected, the method comprises reducing the rotor speed to a rotational speed that is lower than its theoretical rotational speed. The method further comprises, in the third operational range, in case no erosion risk is detected, increasing the rotor speed to a rotational speed that is faster than its theoretical rotational speed.

BRIEF DESCRIPTION OF THE DRAWINGS

Non-limiting examples of the present disclosure will be described in the following, with reference to the appended drawings, in which:

FIG. 3 shows a typical power curve of a wind turbine;

FIG. 4 shows in a very general manner how the lift coefficient and drag coefficient may vary as a function of the angle of attack of a blade section;

FIG. 6 shows the percentage of AEP generated in time for a wind turbine with and without LEPs operating following its theoretical curve; and FIG. 7 shows the percentage AEP of the wind turbine of FIG. 6, with and without LEPs operating according to the methods disclosed herein.

DETAILED DESCRIPTION OF EXAMPLES

Figure 1:
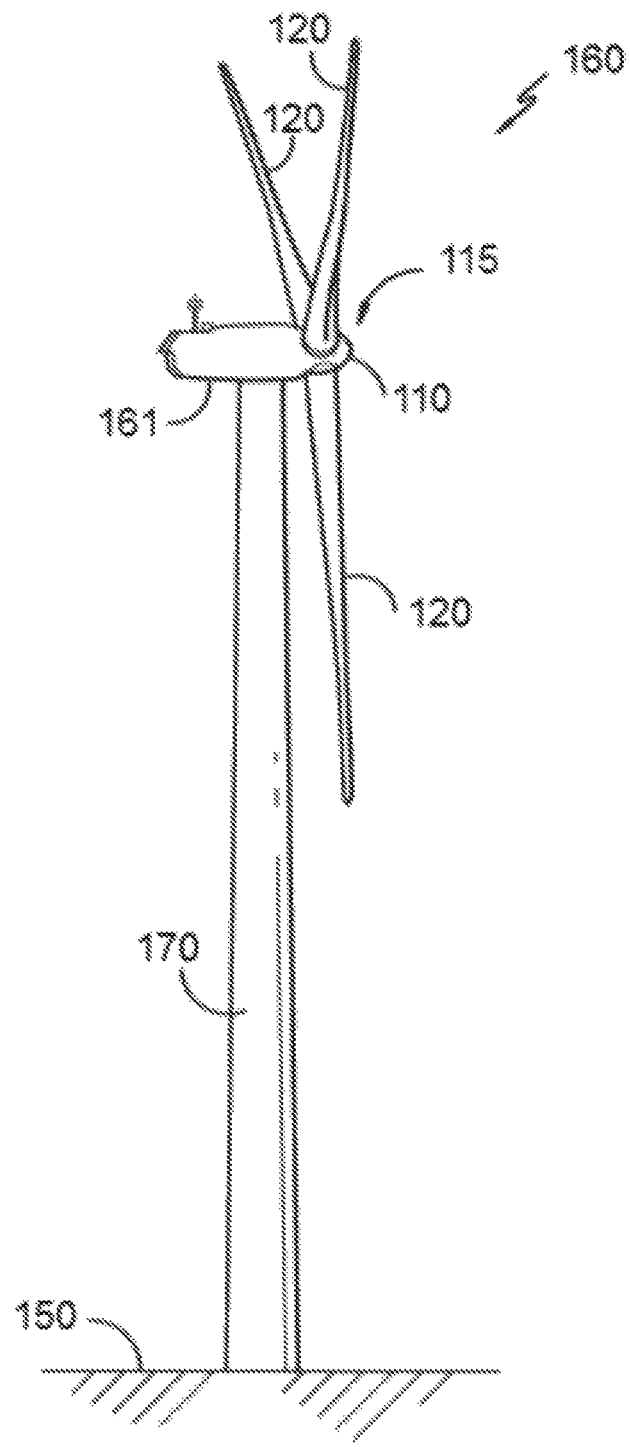
FIG. 1 illustrates a perspective view of one example of a wind turbine.

Reference will now be made in detail to examples, one or more of which are illustrated in the drawings. Each example is provided by way of explanation of the disclosure, not limitation of thereof. In fact, it will be apparent to those skilled in the art that various modifications and variations can be made without departing from the scope of the invention. For instance, features illustrated or described as part of one example can be used with another example to yield a still further example. Thus, it is intended that the present disclosure covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. Particularly in the example of FIG. 1, the rotor 115 includes three rotor blades 120. However, in alternative examples, the rotor 115 may include more or less rotor blades. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to allow electrical energy to be produced.

Figure 2:
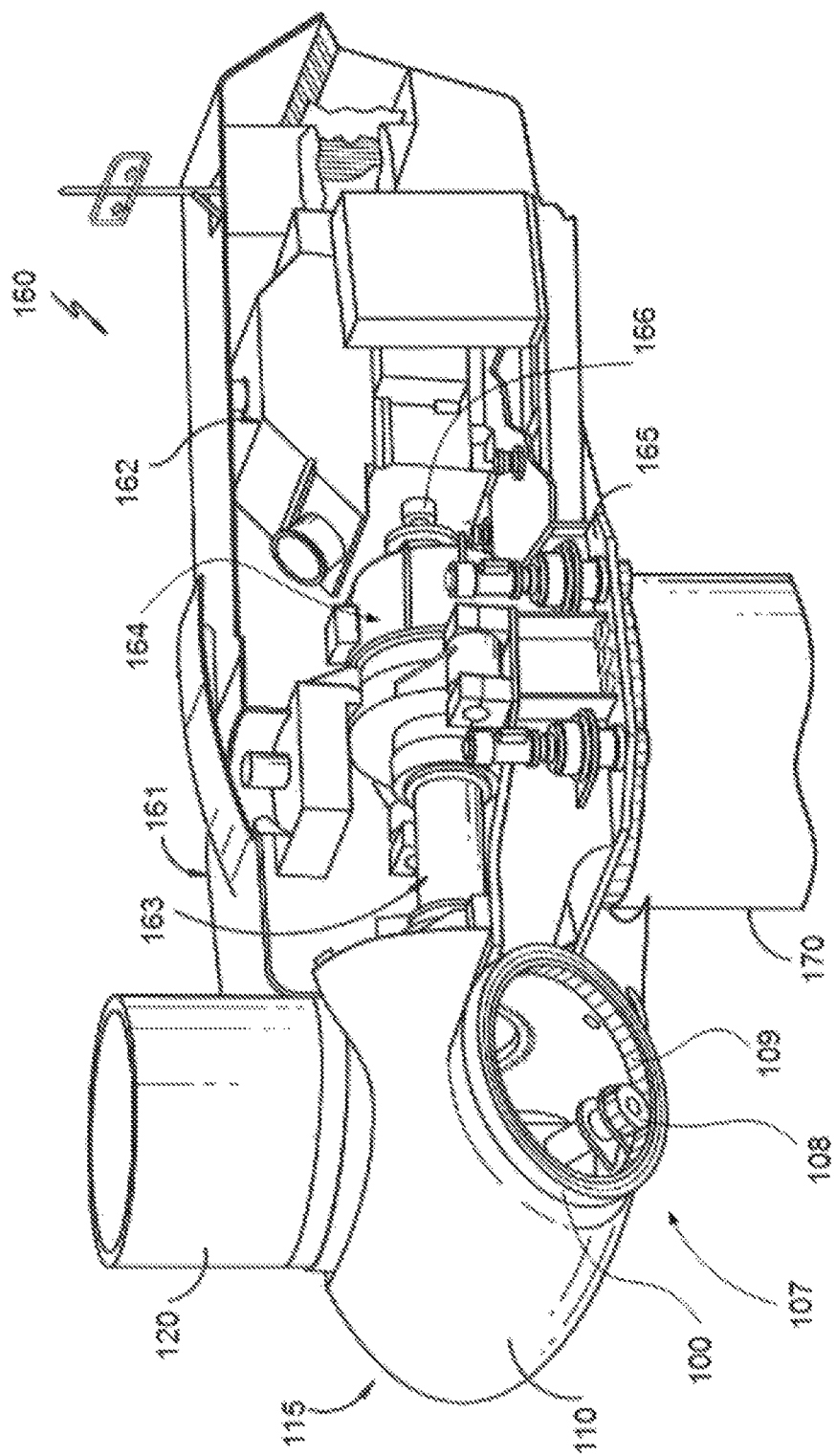
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 is disposed within the nacelle 161. In general, the generator 162 may be coupled to the rotor 115 of the wind turbine 160 for generating electrical power from the rotational energy generated by the rotor 115. In this example, the rotor 115 includes a main rotor shaft 163 coupled to the hub 110 for rotation therewith. The generator 162 is then coupled to the rotor shaft 163 such that rotation of the rotor shaft 163 drives the generator 162. Further in this example, the generator 162 includes a generator shaft 166 rotatably coupled to the rotor shaft 163 through a gearbox 164.

Further in this example, the rotor shaft 163, gearbox 164, and generator 162 are supported within the nacelle 161 by a support frame or bedplate 165 positioned atop the wind turbine tower 170. Other ways of supporting the rotor shaft, gearbox and generator inside the nacelle may be foreseen.

Blades 120 are coupled to the hub 110 with a pitch bearing 100 provided between the blade 120 and the hub 110. The pitch bearing 100 comprises an inner bearing ring and an outer bearing ring mounted so as to allow both bearing rings to rotate relative to each other. A wind turbine blade may be attached either at the inner bearing ring or at the outer bearing ring, whereas the hub is attached to the other of the inner and outer bearing rings. A blade may thus perform a relative rotational movement with respect to the hub when a pitch system 107 is actuated. The pitch system 107 shown in the example of FIG. 2 comprises a pinion 108 that meshes with an annular gear 109 provided on the inner bearing ring to set the wind turbine blade into rotation.

Figure 5:
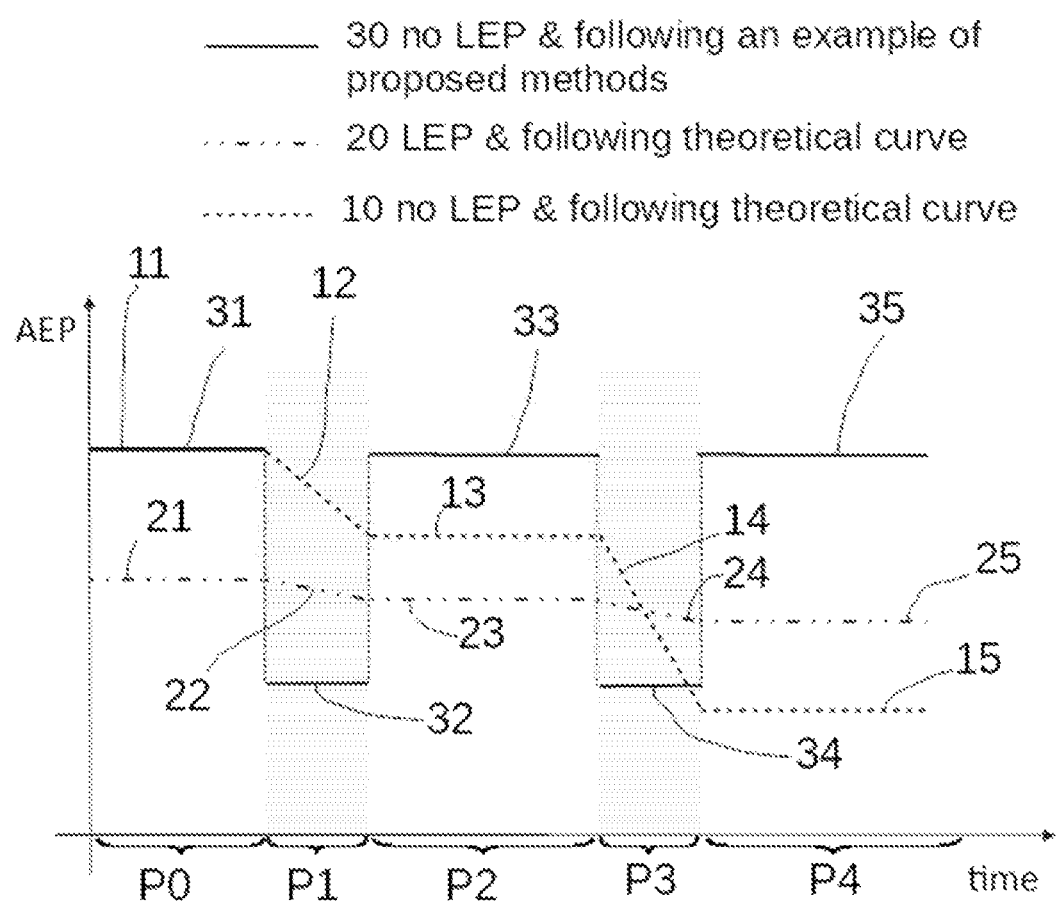
FIG. 5 shows a comparison of Annual Energy Production (AEP) curves for examples of methods according to the present disclosure.

FIG. 5 shows the AEP as a function of time. Curve 10 shows the AEP of a wind turbine operated substantially following its theoretical operating curves. Curve 20 shows the AEP of the wind turbine using leading edge protectors (LEP) and being operated substantially following its theoretical curves. Curve 30 shows the AEP of the wind turbine being operated with an example of the methods substantially as herein before described. In this example, curve 30 shows the behaviour of a wind turbine which does not have LEPs. Other examples may comprise wind turbines using LEPs and operating with examples of the methods substantially as herein before described. In these examples, as explained above, the lifetime of the LEPs is extended at the same time that energy production losses are reduced.

As shown in FIG. 5, curve 10 is made up from sections 11-15; curve 20 is made up from sections 21-25 and curve 30 is made up from section 31-35.

At an initial period of time, P0, sections 11 and 31 respectively corresponding to curves 10 and 30 behave substantially similarly and operate substantially following the theoretical curves. Section 21 shows that wind turbines having LEPs produce less energy than that theoretically produced without the provision of LEPs in the blades, but the lifetime of these blades is extended and losses of AEP are reduced due to erosion in the blades, even if LEPs do get eroded.

At a first period, P1, there is an erosion risk condition detected, e.g. rain. In other examples, other erosion risk conditions may be detected. Section 32 shows that the wind turbine being operated with a method substantially as disclosed herein, produces much less energy (it could even be stopped in circumstances) during this period, i.e. it works in an erosion reduced operation (ERO) mode. This is because, according to the methods disclosed herein, once an erosion risk condition is detected, the rotor speed is varied according to such a detected erosion risk condition.

Particularly in this example, the rotor speed is reduced during this first period P1. Put in other words, in herein disclosed methods, varying the rotor speed as a function of the determined erosion risk condition may comprise rotating the generator rotor at a rotational speed that is lower than its design rotational speed (the one needed to follow its theoretical rotor speed curve, i.e. curve 10).

At a second period, P2, the hazardous condition no longer exists. Sections 33 and 13 show that the wind turbine being operated with a method substantially as disclosed herein, at section 33, produces more energy during this period than that produced by the same wind turbine following its theoretical curves, section 13. This is because, particularly in this example, there are no erosion risk conditions detected during this period P2 and the accumulated erosion damage of the blades in the previous period P1 having erosion prone conditions was avoided or at least reduced. The rotor speed in period P2 is varied as a function of the determined erosion risk condition for this period in combination with the accumulated erosion damage. Rotor speed in period P2 can thus be higher than its theoretical/design rotor speed (the one that follow its theoretical rotor speed curve, i.e. curve 10) thereby producing more energy in this period. In alternative examples, in a period in which no erosion risk conditions are detected and only little or no erosion damage are detected, the rotor speed may be equal to its theoretical/design rotor speed. However, in these cases, less energy will be produced in comparison with curve 30.

At a third period, P3, there is again an erosion risk condition detected, e.g. rain. Section 34 shows again that the wind turbine being operated with a method according to examples disclosed herein produces less energy (in circumstances it could even be stopped) during this period, i.e. it works in an erosion reduced operation (ERO) mode, and less energy is produced than that produced by the wind turbine following its theoretical curve, i.e. section 14. Particularly in this example, in period P3 a wind turbine operating following the theoretical/design curves (i.e. curve 10) already has accumulated erosion damage (e.g. due to its operation in the first period P1, i.e. section 12 of curve 10). This provides for a steeper slope in section 14 than that of section 12 when the wind turbine operates following the theoretical curve. Particularly in this example, the energy production at the end of section 14 is even lower than that produced under the ERO mode of the wind turbine operating following the methods substantially as hereinbefore described, i.e. section 34 of curve 30.

At a fourth period, P4, the erosion risk conditions no longer exist. Sections 35 and 15 show that the wind turbine being operated with a method according to an example as disclosed herein (section 35), produces more energy during this period than that produced by the same wind turbine following its theoretical curves (section 15). A further factor taken into account in this respect can be the erosion damage of one or more of the blades. As mentioned before, the higher power production may be partly due to the fact that the blades of a wind turbine operating under the methods substantially as hereinbefore described have not suffered the same erosion damage in periods P1 and P3. For this reason along, the blades might be aerodynamically more efficient. Moreover, in period P4 during some time, the wind turbine may operate at a higher rotor speed (and produce more energy) in section 35 than that of a wind turbine operating following their theoretical curve (section 15). Alternatively, in P4 the rotor speed may be equal to its theoretical/design rotor speed.

Moreover, as further shown in the example of FIG. 5, a wind turbine provided with LEPs and which operates following the theoretical curves, i.e. curve 20) ends at the fourth period P4 producing higher energy (section 25) than that of a wind turbine operating following their theoretical curve (section 15) and which does not have LEPs, because the blades are less eroded due to the provision of LEPs. It is possible that at the end of the fourth period P4, the blades of wind turbines operating following their theoretical curve (sections 15 and 25) will need maintenance and/or LEP replacement. Whereas on the contrary, the lifetime of the blades of wind turbines operating according to the example as hereinbefore described is extended. Wind turbine downtime may be limited and more energy may be produced.

In general, in herein disclosed methods, operating a wind turbine so as to follow a power curve generating less power than the theoretical power curve may comprise reducing rotor speed to a rotational speed that is lower than its design rotational speed. Whereas, operating a wind turbine so as to follow a power curve generating more power than the theoretical power curve may comprise speeding up rotor speed to a rotational speed that is higher than its design rotational speed. Put in other words, in herein disclosed methods, varying the rotor speed as a function of the determined erosion risk condition and/or the determined erosion damage accumulated over time may provide for e.g. a reduction of rotor speed when there is an erosion risk condition detected at the same time it may provide for e.g. a speeding up of rotor speed when there are no erosion risk conditions.

In some examples, apart from varying rotor speed as a function of the determined erosion risk condition and/or the determined erosion damage accumulated over time, herein disclosed methods may further comprise changing the pitch angle of the blades to modify the angle of attack of the incoming flow and thereby avoid stall.

In circumstances, e.g. when the wind turbine is operating at partial load and the rotor speed is reduced to a rotational speed that is lower than its design rotational speed, herein disclosed methods may increase generator torque so as to avoid or at least reduce losses in power output. When operating at nominal load, an increase in generator torque might be used as well, at least temporarily.

FIGS. 6 and 7 respectively show the percentage of Annual Energy Production (AEP) as a function of time for a wind turbine with and without LEPs and operating following its theoretical curve and in accordance with examples of the methods disclosed herein.

Curves 1000 and 1100 show the AEP of a wind turbine without LEPs respectively operated substantially following theoretical operating curves and with an example of the methods substantially as herein before described. Curves 2000 and 2100 show the AEP of a wind turbine using LEPs respectively operating substantially following its theoretical curves and with an example of the methods substantially as herein before described.

As can be extracted from the example shown in these figures, an average AEP obtained by operating a wind turbine substantially following its theoretical operating curves is 95% whereas when wind turbines are operated with a specific example of a method substantially as herein before described the average AEP obtained raises up to 97%.

Additionally, it can be extracted from these figures, by comparing curves 2000 and 2100 that the lifetime of LEPs (and thereby of blade surfaces) is also extended when wind turbines are operated with examples of the methods substantially as herein before described. Particularly in this example, the life time can be extended by three years. Numeric references 2010 and 2110 respectively indicate the approximate point in time in which maintenance or LEP replacement would be needed.

The enlarged detail of FIG. 6 shows the power generated over a short period of time, e.g. a month, in connection with a rainfall curve 300 in that period. In this detail, an erosion reduced operation (ERO) mode 111 is turned on the days in which the rainfall curve 300 shows peaks 301 and the erosion reduced operation (ERO) mode is not used, but rotor speed is accelerated 112 the rest of days, particularly considering that the erosion damage accumulated by the blades is at acceptable levels. As explained above, when there is no peak of rainfall, i.e. no erosion risk condition is detected or at least it is not higher than a threshold value and the determined accumulated erosion damage is acceptable, the wind turbine can be operated at a rotor speed that is higher than the design rotor speed thereby producing more energy than theoretically. On the contrary, when there is a peak or an erosion risk condition is higher than the threshold or the accumulated erosion damage is no longer within acceptable values, the wind turbine can be operated at a rotor speed that is lower than its design rotor speed and produces less energy. As further explained above, an aspect of avoiding or at least reducing blade erosion in those periods of harsh conditions is that lifetime of the blades is extended and at the same time energy production losses are reduced.

In examples, the methods disclosed herein involve changing the rotor rotational speed as a function of the determined erosion risk condition and of a determined erosion damage accumulated over time. In any of the examples disclosed herein, determining erosion damage may comprise one or more erosion accumulation parameters indicative of accumulated erosion damage. As mentioned above, the provision of accumulated erosion damage (which may be in the form of an erosion accumulation parameter) provides information on how the current blade surface is or should be, based on the conditions that the wind turbine has been exposed to. A more precise control, thus operation, is obtained by considering not only real time erosion risk condition but also historic conditions (current blade surface condition).

In some examples, the erosion accumulation parameter may be based on a register of erosion risk conditions that the wind turbine has been exposed to during its operational time or during its operational time since the last blade maintenance. In a specific example, such an accumulation parameter may be based on the operational time since the last replacement of the leading edge protection. In another example, the accumulation parameter may be based on a count of the number of incidences of rainfall or hail of a specific intensity during the operational time or the operation time since maintenance.

In some examples, changing the rotor rotational speed as a function of the determined erosion risk condition and the determined accumulated erosion damage may comprise assigning a first change in rotor speed as a function of the determined erosion risk condition and correcting the first change in rotor speed as a function of the determined accumulated erosion damage.

In some of these examples, assigning the first change in rotor speed as a function of the determined rotor speed may comprise checking whether the erosion risk condition is above a predefined threshold. In case of a positive result in checking, assigning the first change in rotor speed may comprise assigning a first reduction of rotor speed.

In some examples, correcting the first change in rotor speed as a function of the determined accumulated erosion damage (or erosion accumulation parameter) may comprise comparing the erosion accumulation parameter with a theoretical erosion damage accumulated over time. In case the erosion accumulation parameter is lower than the theoretical erosion damage accumulated over time, correcting the first change in rotor speed may comprise assigning a speed increase (i.e. increasing the rotor speed). I.e. instead of a reduction according to the erosion risk, a small reduction may be the result. In some cases, the sum of the assignment of the first rotor speed change and its correction may be zero, i.e. by taking into account instantaneous erosion risk and accumulated erosion, a rotor speed may be maintained according to is theoretical value rather than a reduction that might be based only on the instantaneous erosion risk.

In examples, in case the erosion accumulation parameter is higher than the theoretical erosion damage accumulated over time, correcting the first change in rotor speed may comprise assigning a speed decrease (i.e. reducing the rotor speed). The result may thus be a more significant decrease in rotor speed than if only the instantaneous erosion risk were taken into account. Correcting the first change in rotor speed as a function of the erosion accumulation parameter implies that the control can consider real erosion damage and not only instant conditions. Put in other words, the accumulated damage over time modifies the control based on a detected erosion risk condition.

By way of example, if there is an erosion risk condition formed by e.g. dust, salinity and/or rain, a wind turbine controller might have a default assignment of reducing rotor speed e.g. 10-20%. If the blade surface however is still good (there is little erosion damage or less erosion damage than expected), the wind turbine controller might instead assign a reduction of only 5% in speed, or maintain the speed according to a theoretical curve.

On the other hand, if the blade surface is already severely damage (e.g. the LEP needs substitution shortly, or the damage of the blade is above expectations), instead of a reduction of 10-20%, a reduction of 30% may be implemented.

In some examples, when the erosion accumulation parameter (or determined accumulated erosion damage) is different than the theoretical erosion damage accumulated over time, the method may further comprise changing the erosion risk condition predefined threshold. This involves adjustment of the erosion risk predefined threshold as a function of real accumulated damage and not merely being predefined in terms of expected erosion wear behaviour.

For example, if according to a predefined control, a rotor speed limitation is implemented starting from a specific rain intensity or drop size, these thresholds of drop size and/or intensity may be reset in view of the status of the blade surface. This means that lower reductions in rotor speed can be used under erosion risk conditions in those cases in which the erosion accumulation parameter (determined accumulated erosion damage) is lower than the theoretical erosion damage accumulated over time.

In some examples, the predefined erosion risk condition threshold may be calculated by simulating a plurality of erosion risk conditions under different simulated air conditions and wind speeds. In accordance with some of the examples described herein, by taking into account erosion damage that has been accumulated, the values coming out of the simulations may be corrected.

In some examples of the methods substantially as hereinbefore described, determining an erosion risk condition of one or more blades may comprise measuring environmental conditions using one or more external condition sensors. In some of these examples, the external condition sensors may be selected from the group consisting of rain sensors, dust sensors, humidity sensors, temperature sensors or any other airborne material sensors. It is thus a quite cost-effective solution that is based primarily on components which are normally already present in a wind turbine or a very easy to retrofit in existing wind turbines if necessary.

In some examples of the methods substantially as hereinbefore described comparing the erosion accumulation parameter with a theoretical erosion damage accumulated over time may comprise visually inspecting a blade surface, particularly a blade leading edge surface.

In some of these examples, visually inspecting the blade surface may comprise using an image treatment system, e.g. a camera, for recording or forming an image of the blade surface. In alternatives, thermographic cameras forming an image using infrared radiation may be foreseen. In some of these examples, recording or forming an image of the blade surface may comprise recording or forming an image of a blade leading edge surface. From image processing, a value of a parameter (based e.g. on colour tones in the image) indicative of erosion damage may be derived. In alternative examples, visually inspecting the blade surface may be done by the maintenance personnel which in situ checks or confirms the blade surface. The erosion accumulation parameter might in examples have a binary value, "damage" or "no damage". Further gradations between "damage" and "no damage" could also be used.

By visually inspecting the blade surface a confirmation of the real erosion condition and/or damage of one or more blades is achieved. A real time monitoring of the method substantially as hereinbefore described can be done. And it is simple and cost-effective to implement. By confirming real erosion damage of one or more blades, operation of the wind turbine is adapted to the real damage condition.

In all the examples, the detected erosion risk condition may include the presence of abrasive particles such as (but not limited to) rain droplets, hail, dust particles, sand particles, insects, salt (particularly for offshore wind turbines) and/or any other harsh environmental conditions.

In all the examples, steady state wind speed may be measured in a variety of ways. LIDAR technology could be used, or e.g. the measurements of the generator rotor speed. The steady state wind speed may also be estimated based on blade deflection detection. To do this the blades may be provided with sensors configured to determine or detect such a blade deflection.

In another aspect a wind turbine is provided. The wind turbine has a rotor with a plurality of blades, a generator having a design rotor speed which varies so as to follow a theoretical generator rotor rotational speed curve describing the rotational speed of the rotor as a function of steady state wind speed, one or more external condition sensors, and a controller configured to carry out a method of operating the wind turbine as a function of wind speed substantially as hereinbefore described. This means, a method comprising determining an erosion risk condition of the blades, and determining an accumulated erosion damage of one or more of the blades. And the method further comprises changing the rotor rotational speed from the design rotor speed as a function of the determined erosion risk condition and the determined accumulated erosion damage.

The erosion damage (or erosion accumulation parameter) may be determined for one or more of the blades. An operational change may be made in examples based on the blade with the worst status, i.e. it is possible that one of the blades has a more eroded surface since not all the Leading Edge Protectors will necessarily have been mounted and perform in the exact same manner. A rotor speed reduction may in particularly be based on the blade which has eroded more. In other examples, some sort of average of the erosion damage of the three blades may be used.

In examples, the wind turbine may be an offshore wind turbine and/or a direct drive wind turbine. In addition, wind turbines having one or more blades comprising a leading edge protector may also be operated with the methods substantially as hereinbefore described.

In another aspect, a method of operating a variable speed wind turbine as a function of wind speed is provided. The wind turbine may have a rotor with a plurality of blades and a generator, wherein the generator has a theoretical generator rotor rotational speed curve describing the theoretical rotational speed of the rotor as a function of steady state wind speed. Operation of the wind turbine comprises a sub-nominal zone of operation for wind speeds below a nominal wind speed, and supra-nominal zone of operation for wind speeds equal to or above the nominal wind speed. The sub-nominal zone of operation comprises a first operational range which extends from a cut-in wind speed to a first wind speed, a second operational range which extends from the first wind speed to a second wind speed, and a third operational range which extends from the second wind speed to the nominal wind speed. The method may comprise operating the wind turbine following a theoretical power curve describing operation of the wind turbine as a function of steady state wind speed, and checking whether an erosion risk condition exists. In case an erosion risk condition is detected, the method may comprise reducing the rotor speed to a rotational speed that is lower than its theoretical rotational speed so as to reduce the generated power. The method further comprises, in the third operational range, in case no erosion risk is detected, increasing the rotor speed to a rotational speed that is faster than its theoretical rotational speed.

Particularly in the third operational range, and particularly for offshore turbines, the rotor speed may be limited according to design because of (the risk) of potential erosion. In the third range, increasing the rotational speed can improve power production, whereas in other sub-nominal ranges, this is not necessarily the case. In the supra-nominal range, the power produced is already at the theoretical maximum.

In examples, the method may further comprise determining an erosion accumulation parameter indicative of erosion damage accumulated over time substantially as explained above. In some of these examples, the method may comprise further changing the rotor rotational speed as a function of the accumulated erosion damage as hereinbefore described in connection with other methods disclosed herein.

In some examples, determining the erosion accumulation parameter or determining the accumulated erosion damage may comprise visual inspection of a blade surface, particularly a blade leading edge surface substantially as explained above.

In all examples, the determined erosion risk condition may comprise abrasive particles selected from the group consisting of rain droplets, hail, dust particles, sand particles, insects, salt and/or any other harsh environmental conditions.

In still another aspect, a method for retrofitting a wind turbine having a rotor with a plurality of blades, a controller and a generator with a design rotor speed which varies so as to follow a theoretical generator rotor rotational speed curve describing the rotational speed of the rotor as a function of wind speed is provided. The method comprises providing one or more external condition sensors and programming the controller to be operatively adapted to determine an erosion risk condition of one or more blades using the external condition sensor. The method may further comprise erosion damage accumulated over time. The controller is further programmed to be operatively adapted to change the rotor speed as a function of the determined erosion risk condition and the determined accumulated erosion damage.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of operating a variable speed wind turbine as a function of wind speed, the wind turbine having a rotor with a plurality of blades and a generator, wherein the generator has a design rotor speed which varies so as to follow a theoretical generator rotor speed curve describing the rotational speed of the rotor as a function of wind speed, the method comprising:
   determining an erosion risk condition of the blades;
   determining erosion damage of one or more of the blades accumulated over time; and
   changing the rotor rotational speed from the design rotor speed as a function of the determined erosion risk condition and the determined accumulated erosion damage.

2. The method of claim 1, wherein changing the rotor rotational speed as a function of the determined erosion risk condition and the determined accumulated erosion damage comprises:
   assigning a first change in rotor speed as a function of the determined erosion risk condition, and
   correcting the first change in rotor speed as a function of the determined accumulated erosion damage.

3. The method of claim 2, wherein assigning the first change in rotor speed as a function of the determined erosion risk condition comprises checking whether the erosion risk condition is above a predefined threshold, and if so, assigning a first reduction in rotor speed.

4. The method of claim 2, wherein correcting the first change in rotor speed as a function of the determined accumulated erosion damage comprises comparing the accumulated erosion damage with a theoretical erosion damage accumulated over time, and in case the determined accumulated erosion damage is lower than the theoretical erosion damage accumulated over time, correcting the first change by increasing the rotor speed.

5. The method of claim 4, wherein operation of the wind turbine comprises a sub-nominal zone of operation for wind speeds below a nominal wind speed, the sub-nominal zone of operation comprising a first operational range which extends from a cut-in wind speed to a first wind speed, a second operational range extending from the first wind speed to a second wind speed, and a third operational range extending from the second wind speed to the nominal wind speed, wherein the method further comprises correcting the first change by increasing the rotor speed in the third operational range (III).

6. The method of claim 2, wherein correcting the first change in rotor speed as a function of the determined accumulated erosion damage comprises comparing the determined accumulated erosion damage with a theoretical erosion damage accumulated over time, and in case the determined accumulated erosion damage is higher than the theoretical erosion damage accumulated over time, correcting the first change by reducing the rotor speed.

7. The method of claim 3, further comprising comparing the determined accumulated erosion damage with a theoretical erosion damage accumulated over time, and in case the determined accumulated erosion damage is different from the theoretical erosion damage accumulated over time, changing the predefined erosion risk condition threshold.

8. The method of claim 3, wherein the predefined erosion risk condition threshold is calculated by simulating a plurality of erosion risk conditions under different simulated air conditions and wind speeds.

9. The method of claim 1, wherein determining an erosion risk condition of one or more blades comprises measuring or estimating environmental conditions using one or more external condition sensors, the one or more external condition sensors comprising at least one of rain sensors, dust sensors, humidity sensors, or temperature sensors.

10. The method of claim 1, wherein determining accumulated erosion damage comprises visually inspecting at least one blade surface.

11. The method of claim 10, wherein inspecting the blade surface comprises using an image treatment system for recording or forming an image of the blade surface.

12. The method of claim 1, wherein wind speed is estimated based on blade deflection detection.

13. A wind turbine, comprising:
   a rotor with a plurality of blades;
   a generator comprising a design rotor speed which varies so as to follow a theoretical generator rotor speed curve describing the rotational speed of the rotor as a function of wind speed;
   one or more external condition sensors; and
   a controller configured to carry out the method of operating the wind turbine according to claim 1.

14. The wind turbine of claim 13, wherein the wind turbine is an offshore wind turbine.

15. The wind turbine of claim 13, further comprising an image treatment system for recording or forming an image of at least one blade surface.

* * * * *